US008784961B2

(12) United States Patent
Nam et al.

(10) Patent No.: US 8,784,961 B2
(45) Date of Patent: Jul. 22, 2014

(54) FLUOROPOLYMER BLENDS WITH INORGANIC LAYERED COMPOUNDS

(75) Inventors: Pham Hoai Nam, Shizuoka (JP); Jeong Chang Lee, Shizuoka (JP); Kenji Oki, Shizuoka (JP); Hajime Sato, Shizuoka (JP)

(73) Assignee: Dupont Mitsui Fluorochemicals Co Ltd

( * ) Notice: Subject to any disclaimer, the term of this patent is extended or adjusted under 35 U.S.C. 154(b) by 775 days.

(21) Appl. No.: 12/482,633

(22) Filed: Jun. 11, 2009

(65) Prior Publication Data

US 2009/0297751 A1 Dec. 3, 2009

Related U.S. Application Data

(63) Continuation of application No. 11/904,764, filed on Sep. 28, 2007, now abandoned.

(30) Foreign Application Priority Data

Oct. 2, 2006 (JP) ................................ 2006-271228
Oct. 2, 2006 (JP) ................................ 2006-271232

(51) Int. Cl.

*B32B 1/08* (2006.01)
*B32B 5/00* (2006.01)
*B32B 5/16* (2006.01)
*C08L 27/12* (2006.01)
*C08F 214/26* (2006.01)
*C08K 3/34* (2006.01)
*B29K 27/12* (2006.01)

(52) U.S. Cl.

CPC ............. *C08F 214/262* (2013.01); *C08L 27/12* (2013.01); *B29K 2027/12* (2013.01); *C08K 3/34* (2013.01)
USPC .......... 428/36.9; 428/339; 428/402; 524/544; 524/545

(58) Field of Classification Search

CPC ......... C08L 27/12; C08K 3/34; C08F 214/18; C08F 214/184; C08F 214/26; B29K 2027/12; B32B 5/00; B32B 5/16; B32B 27/322
USPC .......... 523/333; 524/442, 444, 445, 446, 447, 524/449, 492, 493; 428/323, 324, 331, 421, 428/422; 528/370, 372, 297, 401
See application file for complete search history.

(56) References Cited

U.S. PATENT DOCUMENTS 4,262,101 A * 4/1981 Hartwimmer et al. .......... 526/89
4,675,380 A * 6/1987 Buckmaster et al. ......... 528/481
5,962,553 A 10/1999 Ellsworth
5,969,029 A 10/1999 Kotani et al.
6,177,533 B1 1/2001 Woodward
6,372,870 B1 * 4/2002 Kitahara et al. .............. 526/250
2002/0165305 A1 11/2002 Knudson et al.
2003/0144398 A1 7/2003 Cody et al.
2003/0228463 A1 * 12/2003 Abusleme et al. ............ 428/402
2005/0187328 A1 8/2005 Globus et al.

FOREIGN PATENT DOCUMENTS

CN 1238353 12/1999
EP 1538127 A1 6/2005
WO 2004074371 A1 9/2004
WO 2006083796 A2 8/2006
WO 2007041227 A1 4/2007

OTHER PUBLICATIONS

Scheirs, John, Modern Fluoropolymers, High Performance Polymers for Diverse Applications, John Wiley & Sons, NY, 1997, p. 5-66.
Cullity, B. D., Elements of X-Ray Diffraction, 2nd Edition, Addison-Wesley Publishing Company, Inc., Reading, Massachusetts, 1978, pp. 99-109.
Fukushima, Y., X-Ray Diffraction Study of Aqueous Montmorillonite Emulsions, Clays and Clay Minerals, vol. 32, No. 4, 1984, pp. 320-326.
Wang, X., et al., Cooperative Toughening and Cooperative Compatibilization: The Nylon 6/Ethylene-Co-Vinyl Acetate/Ethylene-Co-Acrylic Acid Blends, Polymer 42 (2001) pp. 9211-9216.
Zhang, L. et al, Morphology and Mechanical Properties of Clay/Styrene-Butadiene Rubber Nanocomposites, Journal of Applied Polymer Science, vol. 78, 2000, pp. 1873-1879.
Tahara S., et al., Preparation of a Nanocomposite Consisting of a Siloxane Network and Perovskite-Related Nanosheets Via a Sol-Gel Process, Science and Technology of Advanced Materials 7 (2006) 446-450.
Hirose, M. et al, Organic/Inorganic Nanocomponent by Fracture Dispersion of Silica Porous Body, 47th Material Cominational Lecture Meeting, Science Council of Japan, vol. 47, pp. 150-151, 2003.
Usuki, A. et al, Polymer-Clay Nanocomposites, Adv Polym Sci (2005) 1979: 135-195.
Kim, Y. et al, Melt-Intercalation Nanocomposites With Fluorinated Polymers and a Correlation for Nanocomposite Formation, Journal of Applied Polymer Science, vol. 92, pp. 1061-1071, 2004.

* cited by examiner

*Primary Examiner* — Bijan Ahvazi
*Assistant Examiner* — Ronald Grinsted
(74) *Attorney, Agent, or Firm* — Keith W. Palmer

(57) ABSTRACT

Perfluoropolymer composites are provided which are obtained by dispersing layered-silicates having properties of swelling or cleaving in dispersion media in perfluoropolymers and having the ratio of the viscosity, $V_{0.1}$, at 0.1 rad/sec by a parallel plate mode of a dynamic rheometer to the viscosity, $V_1$, measured at 1 rad/sec is 1.5 or greater, viscosity being measured at 340° C. A method for making the perfluoropolymer composites is provided, and molded articles therefrom. And additionally, perfluoropolymer composites, where layered-silicates having properties of swelling or cleaving in dispersion media are dispersed in perfluoropolymers, with the storage elasticity of 2 times or higher than that of fluoropolymers, at temperatures greater than the glass transition temperature of perfluoropolymers.

14 Claims, 5 Drawing Sheets

FLUOROPOLYMER BLENDS WITH INORGANIC LAYERED COMPOUNDS

STATUS OF RELATED APPLICATION

This application is a continuation of U.S. patent application Ser. No. 11/904,764, filed Sep. 28, 2007, now abandoned.

FIELD OF THE INVENTION

The present invention relates to perfluoropolymer composites, and a production method thereof, wherein the dynamic physical or mechanical characteristics are improved by homogeneously dispersing layered-silicates in perfluoropolymers, and even when the shear rate becomes small, the melt viscosity does not approach a fixed value, furthermore the zero shear rate viscosity is increased. Further, the storage elasticity at temperatures greater than the glass transition temperature of the perfluoropolymer is improved.

BACKGROUND OF THE INVENTION

Melt processable perfluoropolymers such as tetrafluoroethylene/perfluoro(alkyl vinyl ether) (PFA), tetrafluoroethylene/hexafluoropropylene (FEP), tetrafluoroethylene/hexafluoropropylene, and perfluoro(alkyl vinyl ether) are processed in the melt by methods such as extrusion molding, blow molding, injection molding, and rotomolding. The resulting molded articles have good high temperature properties, chemical resistance, low coefficients of friction, flame resistance, and good electrical properties (low dielectric, low dissipation). However, perfluoropolymers have lower dynamic physical properties than do partially fluorinated fluoropolymers showing polarity such as polyvinylidene fluoride (PVDF), ethylene/tetrafluoroethylene (ETFE) and polychlorotrifluoroethylene (PCTFE). Unlike the partially fluorinated fluoropolymers, which have intermolecular interaction, in perfluoropolymers there is almost no attraction between polymer molecules (chains) (Modern Fluoropolymers, John Wiley & Sons, NY, 1997, pp. 5-66). Further, the dynamic physical properties, such as elasticity, suffer reduction at temperatures greater than or equal to the glass transition temperature. The glass transition temperature ($\alpha$ transition temperature) of the perfluoropolymers is generally 120° C. or lower. Additionally, perfluoropolymers are flame-resistant, but when exposed to the heat of a fire, melt and can flow, resulting in high-temperature liquid droplets that generate smoke and can spread fire.

U.S. Pat. No. 6,177,518 discloses that the heat distortion temperature and elasticity of perfluoropolymers are improved by blending the perfluoropolymers with polyether ketone. However, this improvement in dynamic physical properties at high temperature is achieved at the sacrifice of a part of perfluorinated character (e.g., chemical resistance, electrical properties) of the fluoropolymers since 30% or more of polyether ketone is blended with perfluoropolymers.

Recently, techniques have been proposed for improving the mechanical characteristics (e.g. heat distortion temperature, chemical resistance, gas permeability) by directly melt-mixing polymers with inorganic fine particles. If inorganic fine particles are melt-mixed in polymers, however, the cohesive force of the inorganic particulates increases as the particle diameter decreases, causing re-agglomeration of the particles to occur. Therefore, it is extremely difficult to disperse inorganic fine particles at the nanoparticles level in polymers (47th Material Research Combinational Lecture Meeting, Science Council of Japan, Vol. 47, p. 150, 2003).

In reports on techniques for nanodispersing organically processed layered-silicates in polymer materials to solve these problems, in many cases the polymers used are polar polymers such as polyamide perfluoropolymers (Advanced Polymer Science, p. 135, 2005). In attempts to organically disperse processed layered-silicates in fluoropolymers, nanodispersing was successful in partially fluorinated fluoropolymers such as polyvinylidene fluoride (PVDF), which as noted above have polarity and show intermolecular interaction, but not in perfluoropolymers such as THE/HFP copolymers (FEP) (Journal of Applied Polymer Science, vol. 92, p. 1061, 2004). Further, in Kokai Patent 2000-204214, fluoropolymer nanocomposites obtained by melt-mixing mainly fluorine-containing rubber with organically processed layered-silicates are described, but there is no description of perfluoropolymers being so treated.

U.S. Pat. No. 5,962,553 discloses the melt-mixing of organophosphonium-treated layered-silicates with perfluoropolymers to improve dynamic physical properties. But, there is no evidence such as X-ray measurement or electron microscope observation to confirm the nano-dispersion of the layered-silicates in the perfluoropolymers. The elastic modulus of the resulting perfluoropolymer composites is greater than that of the perfluoropolymer itself by no more than two times. Furthermore, because the layered-silicates are processed with organophosphonium, the chemical resistance and high temperature properties of the resulting perfluoropolymer composites are less than that of the perfluoropolymer itself.

WO 2004/074371 discloses that the physical properties such as gas and chemical impermeability and elasticity, of melt processable fluoropolymers are improved by adding both organophosphonium-treated layered-silicates and functional group-containing melt processable fluoropolymers to melt processable fluoropolymers and melt-mixing. For example, the storage elasticity at room temperature is about twice that of the fluoropolymer itself. However, since functional group-containing melt processable fluoropolymers in addition to organophosphonium-treated layered-silicates are contained, however, the heat resistance of the resulting perfluoropolymer composites is reduced. There is also an economic penalty due to the use of expensive functional group-containing melt processable fluoropolymers.

U.S. Patent Application No. 2003/0228463 discloses that fluoropolymer composites obtained by nanodispersing layered-silicates without organic treatment in fluoropolymers such as polychlorotrifluoroethylene (PCTFE), have improved dynamic physical properties and storage elasticity at room temperature and at temperatures of 100° C. or higher. The good chemical resistance and heat resistance of the fluoropolymer itself is retained. The perfluoropolymer composites are obtained by mixing aqueous fluoropolymer dispersions of for example, PCTFE, with dispersions of layered-silicates having no organic treatment and then by precipitating, separating and drying of the solid phase of the resulting mixed aqueous solutions. The high temperature (150° C.) storage elasticity of the fluoropolymer composites showing polarity like PCTFE was increased about 2.5 times as compared to that of the fluoropolymer itself. However, but there is no disclosure as to whether the improvement of storage elasticity could be obtained in perfluoropolymers that have no polarity, and therefore no intermolecular interaction. The procedure of blending dispersions of nanodispersing layered-silicates and fluoropolymer dispersions followed by precipitating, separating and drying the solid phase of aqueous mixed solution, has also been reported in Chinese Laid Open Patent CN 1238353A and Journal of Applied Polymer Science, vol. 78, p. 1873 ff, p. 1879 ff, 2000.

Because of their superior electrical properties and heat and flame resistance, perfluoropolymers are widely used as insulation and jacket materials of communication cables (plenum cable). In these perfluoropolymers for communication cables, the extrudability onto the wire (conductor) improves as the melt viscosity decreases (i.e., as the melt flow rate increases). However, communication cables insulated with perfluoropolymers having low melt viscosity are at risk of dripping molten polymer when a fire breaks out, causing smoke generation and spread of the fire. To prevent fire propagation caused by cable insulation, the flame resistance standards are in place, as for example the US NPFA-255 standards. Accordingly, perfluoropolymers are needed that, in electric wire extrusion, have low viscosity and therefore superior processability (e.g. speed) on wire coating lines, but which on the other hand have high viscosity at low shear rate such as under the influence of gravity, so that the wire insulation does not drip when exposed to fire temperatures.

Perfluoropolymer compositions resistant to dripping when exposed to fire have been made by blending perfluoropolymers with a large amount of inorganic fillers, such as 10-60% of zinc oxide, and a small amount of hydrocarbon polymers for preventing deterioration of physical properties (U.S. Patent Application No. 2005/0187328). However, other properties of perfluoropolymers are compromised by the use of large amounts of inorganic fillers such as zinc oxide. Further, since zinc oxide and perfluoropolymers are directly melt-blended, conventional microcomposites having poor high-speed extrudability are obtained. They are not nanocomposites.

There is a need for perfluoropolymers having low viscosity at high shear and high viscosity at low shear, that also maintain good storage elasticity above their glass transition temperatures, without the addition of excessive amounts of filler.

SUMMARY OF THE INVENTION

Surprisingly it has been discovered that layered-silicate can be dispersed effectively as nano-sized particles in perfluoropolymer despite the lack of polarity of perfluoropolymer.

In one embodiment, the present invention provides a perfluoropolymer composite obtained by dispersing layered-silicate having properties of swelling or cleaving in dispersion media, in perfluoropolymer wherein the layer thickness of said layered-silicate in said composite is less than about 100 nm.

In a second embodiment, the present invention provides a method for producing perfluoropolymer composite by mixing a dispersion of perfluoropolymers with a dispersion containing layered-silicate having properties of swelling or cleaving in dispersion media under stirring to obtain mixed aqueous dispersion, agglomerating the mixed aqueous dispersion, separating the aqueous components from the agglomerates, and drying.

In a third embodiment, the present invention provides a method for producing perfluoropolymer composite by mixing a dispersion of perfluoropolymers with layered-silicate having properties of swelling or cleaving in dispersion media under stirring to obtain an aqueous dispersion of perfluoropolymer and layered-silicate, agglomerating the mixed aqueous dispersion, separating the aqueous components from the agglomerates, and drying.

According to the present invention, various molded articles having superior performance and superior physical properties are provided from perfluoropolymer composites of the invention.

BRIEF DESCRIPTION OF THE DRAWINGS

The invention will be more fully understood from the following detailed description, taken in connection with the accompanying drawings, in which:

FIG. 2 is a transmission electron microphotography of perfluoropolymer composite used in Application Example 1.

DETAILED DESCRIPTION OF THE INVENTION

Figure 1:
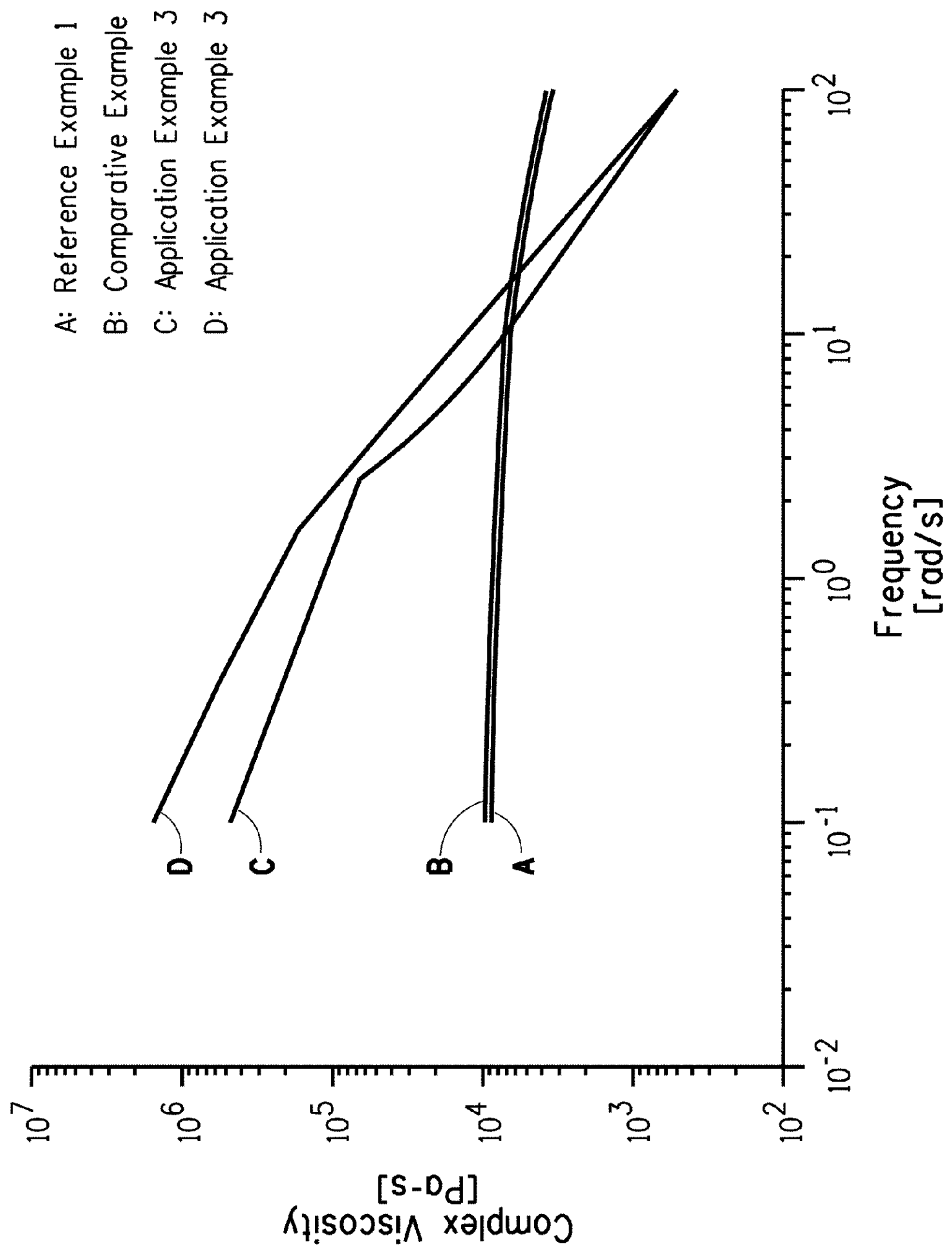
FIG. 1 shows the measurement results of shear rate viscosity of perfluoropolymer composites.

As perfluoropolymers used in the present invention, polymers of perfluoromonomers (monomers in which all the monovalent atoms are fluorine atoms), such as tetrafluoroethylene (TFE), hexafluoropropylene (HFP), perfluoro(alkyl vinyl ether) (PAVE) are exemplified. Specific examples of perfluoropolymers include polytetrafluoroethylene (hereinafter called PTFE), TFE/PAVE copolymer (hereinafter called PFA), TFE/HEP copolymer (hereinafter, called FEP), and TFE/HFP/PAVE. PTFE differs from TFE copolymers in that it is not melt processable using equipment for processing thermoplastics, such as extruders and injection molding machines. PTFE includes what is known as modified PTFE, a polymer of TFE and small amounts of another monomer, such as HFP or PAVE at low concentrations, typically less than 1 mol % and more usually less than 1 wt %. Like PTFE, modified PTFE is not melt processable. PTFE and modified PTFE do not include what is known as micropowder, a low molecular weight PTFE, which though melt processable, does not make useful articles, being brittle or friable. Micropowder finds utility as an additive.

Preferred polymers are copolymers of TFE and HFP and/or PAVE. Among these, more preferred is TFE/PAVE copolymer, also know as PFA, wherein the alkyl group of the PAVE contains 1-5 carbon atoms and preferably 1-3 carbon atoms for perfluoro(alkyl vinyl ether) is preferred. Further, blends of these polymers with each other may be used, preferably blends of the copolymers.

Perfluoropolymer dispersions used in the present invention are dispersions containing the perfluoropolymers. Examples of dispersions of perfluoropolymers are polymers of monomers selected from, for example, polytetrafluoroethylene (PTFE), hexafluoropropylene (HFP), and perfluoroalkyl vinyl ether (PAVE). As perfluoropolymer dispersions, those commercially available can be used. Dispersions of these polymers are prepared by aqueous dispersion polymerization.

In the present invention, perfluoropolymer dispersions and dispersions containing layered-silicates having properties of swelling or cleaving in dispersion media are 1) mixed to obtain an aqueous dispersion containing the perfluoropolymer primary particles (the perfluoropolymer particles as they exist in aqueous dispersion after aqueous dispersion polymerization, typically 50 to 250 nm in diameter) and the swelled or cleaved layered-silicates, 2) treated to agglomerate the fluocarbon primary particles and the layered-silicates, and 3) the agglomerates are separated from the aqueous medium and dried to obtain the perfluoropolymer composites of the present invention, wherein the layered-silicates are homogeneously dispersed at the nano level in the perfluoropolymer.

Accordingly, in the present invention, a dispersion containing inorganic layer compounds, which are swollen and cleaved and dispersed in water, is added to a stable dispersion of perfluoropolymer and mixed, agglomerated, and dried to obtain dry powder of agglomerates comprising homogeneously dispersed perfluoropolymer primary particles and layered-silicates. Any perfluoropolymer dispersion obtained by aqueous dispersion polymerization can be used independent of the properties such as molecular structure, melting point, crystallization temperature, and melt viscosity, of the perfluoropolymer. However, the range of melt viscosity or melt flow rate (MFR) of perfluoropolymer dispersions will be chosen according to the objective of melt fabrication of the composite. For example, as the melt viscosity of perfluoropolymer composites for melt processing such as in extrusion, and injection molding, the preferred range of melt flow rate (MFR) at 372° C. is 0.5-100 g/10 minute and more preferably 0.5-50 g/10 minute. The glass transition temperature (α transition temperature) of perfluoropolymers is a function of the polymer composition. Generally the glass transition temperature of commercial PFA is about 90° C. and the glass transition temperature of FEP is about 80° C. Accordingly, if the temperature exceeds 100° C. in these perfluoropolymers, the dynamic physical properties such as elasticity, are reduced.

Specific examples of layered-silicates having swelling or cleaving properties used in the present invention include smectite-group clay minerals, such as natural or synthetic bentolite, saponite, Stevensite, beidellite, montmorillonite, and bentonite, swelling mica-group clay minerals, such as Na type tetrasilicic fluoromica, Li type tetrasilicic fluoromica, Na salt type fluorotaeniolite, Li type fluorotaeniolite, vermiculite, substitution products or derivatives of these, or their mixtures. Furthermore, the substitution products include those obtained by substituting potassium ion for sodium ion as the interlayer ion or a part of lithium ion and those obtained by substituting magnesium ion for a part of silicon ion in the tetrahedron sheet.

Commercially available products include Laponite XLG (Laporte Industries Co., England, synthetic hectorite), Laponite RD (Laporte Industries Co., England, synthetic hectorite), Smecton SA-1 (naponite imitation, Kunimine Industries Co.), Bengel (natural montmorillonite, available from ToyojunYoko), Kunipia F (natural montmorillonite, available from Kunimine Industries Co.), Veegum (natural hectorite from Vanderbilt Co., USA), Dimonite (synthetic swelling mica from Topy Industries Co.), Closite (montmorillonite from Sazan Clay Co., USA), Somashif (MF-100, synthetic swelling mica from Coop Chemicals), and SWN (synthetic smectite from Coop Chemicals).

Among the swelling layered-silicates, swollen mica, which is obtained by heating talc and alkali silicofluoride, is preferred. More preferred is extensively swollen mica, which is obtained by mixing talc with sodium silicofluoride and/or lithium silicofluoride to obtain a fine powder mixture and heating at 600-1200° C.

The particle diameter of the layered-silicate raw materials in the present invention is 10,000 nm or less and preferably, 5,000 nm or less for the purpose of achieving high zero shear rate viscosity in the perfluoropolymer composite, although it may vary with the application objective. Furthermore, the aspect ratio (particle diameter, or if not exactly round, the largest linear dimension, to particle thickness) of layered-silicates in the state of homogeneously dispersed at the nano level in fluoropolymer matrix is 40 or higher and preferably 100 or higher.

Furthermore, in the present invention, as an alternative to the above described method for preparing aqueous dispersions containing perfluoropolymer primary particles and layered-silicates by stirring perfluoropolymer dispersions and dispersions containing layered-silicates, the solid layered-silicate may be directly added to perfluoropolymer dispersions and stirred. However, if strong shear is applied to the mixed solution for homogeneous mixing of the fluoropolymer primary particles and layered-silicate powder, the stability of the perfluoropolymer dispersion may be broken down so that the perfluoropolymer dispersion becomes unstable and agglomerated before satisfactory mixing-in of the layered-silicates, and therefore sometimes homogenous mixed solution cannot be obtained. Accordingly, it is preferred from the viewpoint of homogeneous dispersion of the layered-silicates in the mixed solution that the layered-silicate powder be dissolved in water beforehand to prepare solutions containing 0.5-30% by weight of the layered-silicates preferably at 20-80° C., further it is preferred to disperse the layered-silicates by mixing under agitation (mechanical stirring and/or ultrasound treatment) for 2 hours or more, preferably 4 hours or more, and further preferably 6 hours or more although it may vary with type and structure of the stirring apparatus. In the aqueous dispersions thus prepared, the layers are separated by intrusion of water between to swell the layered-silicates promoting their dispersion in water (Clay and Clay Minerals, vol. 32, p. 320, 1984). Further, in stirring of the aqueous dispersion containing layered-silicates, the aqueous dispersions are strongly stirred which promotes the cleavage of the layers.

Accordingly, the dispersion containing layered-silicates is added to perfluoropolymer dispersion containing stably dispersed perfluoropolymer primary particles and mixed to obtain dispersion (mixed solution) containing homogeneously dispersed fluoropolymer primary particles and layered-silicates.

As the method for agglomerating the aqueous dispersions containing homogeneously dispersed fluoropolymer primary particles and layered-silicates, the method of freezing and thawing the aqueous dispersions at a temperature of 0° C. or lower, the method of adding electrolytes to change the ionic strength or the pH of the mixed solution, and the method of applying shear may be used.

The method for applying shear to the aqueous dispersions is a method for stirring the mixed solution comprising the perfluoropolymer dispersion and the dispersion containing layered-silicates to break the micelle structure of the surfactant in the perfluoropolymer dispersions to agglomerate them (physical agglomeration).

The method for freezing the aqueous mixed solution at a temperature of 0° C. or lower is a method for freezing the mixed solution to form ice crystals thereby causing agglomeration (freeze agglomeration).

The method for changing the ionic strength or the pH of the mixed solution by adding electrolytes is a method for suddenly lowering the stability of the mixed solution of the perfluoropolymer dispersion and the layered-silicate dispersion by adding electrolytes to the mixed solution to change the ionic strength or the pH (chemical agglomeration).

Chemical agglomeration is the method of adding electrolytes or inorganic salts to the dispersion made by mixing of perfluoropolymer dispersion and inorganic layer compound dispersion to lower the stability of the mixed solution. As the electrolytes to be used for chemical agglomeration of fluoropolymer primary particles in the perfluoropolymer dispersions, inorganic or organic compounds, such as water-soluble HCl, $H_2SO_4$, $HNO_3$, $H_3PO_4$, $Na_2SO_4$, $MgCl_2$, $CaCl_2$, sodium formate, potassium formate, ammonium carbonate, can be illustrated. Among those, compounds, which can be evaporated in the subsequent drying process, such as HCl, $HNO_3$, and ammonium carbonate, are preferred. Beside these electrolytes, also usable singly or in combination are alkali metal salts and alkaline earth metal salts of hydrohalic acids, phosphoric acid, sulfuric acid, molybdic acid, and nitric acid, ammonium salts, preferably, inorganic salts, such as potassium bromide, potassium nitrate, potassium iodide (KI), ammonium molybdate, sodium dihydrogen phosphate, ammonium bromide ($NH_4Br$), potassium chloride, calcium chloride, copper chloride, and calcium nitrate. These electrolytes can be used concentrations of 0.001-5% by weight and preferably 0.05-1% by weight with respect to the weight of the mixed solution of the perfluoropolymer dispersion and the layered-silicate dispersion, although it may vary with type of electrolytes and solid contents in the perfluoropolymer dispersion and the layered-silicate dispersion. Further, it is preferred to add the electrolytes as aqueous solutions to the mixed solution of the perfluoropolymer dispersion and the layered-silicate dispersion. When the electrolyte amount is insufficient, the homogeneously mixed state of the perfluoropolymer primary particles and the layered-silicates as a whole cannot be immobilized at one stretch since there is such a place where agglomeration occurs slowly and nonuniformly so that sometimes perfluoropolymer composite containing homogeneously dispersed layered-silicates in perfluoropolymer cannot be obtained.

It is also possible for obtaining homogeneous mixed solution by stirring perfluoropolymer dispersion and dispersion containing layered-silicates to carry out stirring and mixing after the perfluoropolymer dispersion or dispersion containing layered-silicates are diluted with deionized water to adjust the solids concentration. The desirability of this depends on the solids concentration of the perfluoropolymer dispersion and dispersion containing layered-silicates.

The apparatus for stirring the perfluoropolymer dispersion and dispersion containing layered-silicates to obtain homogeneous mixed solution and agglomerating physically or chemically the mixed solution is not restricted to any specific type. An apparatus equipped with a stirring means able to control the stirring velocity, for example, propeller blade, turbine blade, puddle blade, shell-form blade, horseshoe type blade, and spiral blade, and a draining means is preferred. In such an apparatus, electrolytes or inorganic salts are added to the mixed solution of perfluoropolymer dispersion and layered-silicates or dispersion containing layered-silicates and stirred to agglomerate colloid particles of the perfluoropolymer and/or the layered-silicates to give agglomerates, which are separated from the aqueous medium. As the stirring velocity of the process for separating the aqueous medium from the agglomerates, a stirring velocity of at least 1.5 times faster than the stirring velocity of the mixing process for the perfluoropolymer dispersion and the dispersion containing layered-silicates is preferred. The agglomerates are washed with water if necessary after discharging aqueous medium and dried at a temperature below the melting point of the perfluoropolymer or the onset of thermal decomposition to obtain powder of a perfluoropolymer composite. A temperature below thermal degradation or decomposition temperature of the perfluoropolymer but adequate for evaporating electrolytes and surfactants is preferred for the drying temperature.

It should be noted that in some cases, especially when electrolyte is used, the agglomerates may form a stable gel, from which it is difficult or impossible to separate the aqueous medium. In such cases, the gelled agglomerates may be dried directly. If desired, the dried material may be washed with water, and dried again.

The amount of the layered-silicates to the perfluoropolymer composite is 0.1-30% by weight, preferably 0.3-20% by weight, and more preferably 0.5-15% by weight based on the total weight of the composite. Nano perfluoropolymer composite mixtures, where layered-silicates are dispersed at the nano level in perfluoropolymers, or so-called polymer nanocomposites, have the advantage of being able to improve the physical properties even when layered-silicates are present at lower concentrations than conventional perfluoropolymer composite mixtures. This is because the interfacial area between nanoparticles and polymer matrix is high compared to conventional perfluoropolymer composite mixtures where fillers are dispersed at micron (micrometer) level.

Concentrated polymer solution or molten polymer is typically a non-Newtonian fluid, the viscosity depending on the shear rate. The viscosity decreases as the shear rate increases, and conversely, the viscosity increases as the shear rate decreases. However, when the shear rate becomes very low, the viscosity approaches a fixed value. This limiting value is called zero shear rate viscosity ($\eta^*$), and is an important physical quantity. It is expressible as an exponential function.

For example, the melt viscosity of perfluoropolymers generally approaches a constant value as the shear rate decrease and in this range, behaves like a Newtonian fluid (A of FIG. 1). Further, even in conventional perfluoropolymer composite mixtures obtained by melt-mixing layered-silicate in perfluoropolymer (microcomposites), the viscosity rises at almost constant rate comparable with perfluoropolymers containing no layered-silicates, and approaches a fixed value as the shear rate decreases and showing almost Newtonian fluid behavior (B of FIG. 1).

In perfluoropolymer composites containing layered-silicates homogeneously nano-dispersed in perfluoropolymer of the present invention, however, the melt viscosity continues to rise as shear rate decreases without approaching to a fixed value, thereby showing non-Newtonian behavior even at very low shear rates (C, D in FIG. 1). Because the viscosity of the perfluoropolymer composites containing layered-silicates homogeneously nano-dispersed in the perfluoropolymers continues to rise as shear rate decreases, the perfluoropolymer composites are useful as wire insulation that will not drip when exposed to flame.

In the case of perfluoropolymer composites of the present invention, the ratio $V_{0.1}/V_1$=1.5 or greater, preferably 2.0 or greater, and further preferably 3.0 or greater, $V_{0.1}$ being the viscosity measured at 340° C. and 0.1 rad/sec, and $V_1$ being the viscosity measured at 1 rad/sec, measurement being done by parallel plate dynamic rheometer.

The ratio ($G'_S/G'_F$) of the storage elasticity ($G'_S$) of the perfluoropolymer composites to the storage elasticity ($G'_F$) of the fluoropolymer itself at temperatures greater than the glass transition temperature of the perfluoropolymer, is 2 or greater and preferably 3 or greater.

The preferable mode of perfluoropolymer composites of the present invention are perfluoropolymer composites with, as perfluoropolymers, polymers or copolymers of monomers selected from tetrafluoroethylene, hexafluoropropylene, and perfluoro(alkyl vinyl ether) and the ratio ($G'_S/G'_F$) of the storage elasticity ($G'_S$) to the storage elasticity ($G'_F$) Of fluoropolymers, at a temperature 60° C. higher than the glass transition temperature of the perfluoropolymer, of 2 or greater and preferably 3 or greater.

In the present invention, the powder obtained by drying the agglomerates, comprising perfluoropolymer primary particles and layered-silicates obtained in the agglomeration-drying process, can be melt processed by methods such as extrusion, injection molding, transfer molding, and blow molding after pelletizing with an ordinary melt extruder. It is also possible to use the powder directly without pelletizing as material for molding, such as in rotomolding. Additionally, the dried agglomerate powder may be compacted into larger particles to improve the flow of the powder, such as into the feed hopper of the molding machine. The agglomerate powder of non-pelletized particles has higher elasticity and viscosity at low shear rate (zero shear rate viscosity) and a tendency of lowering the elongation than the pelletized one, and thus the pellet or powder of agglomerates can be selected according to the application purpose (refer to Tables 1 and 2). Further, in the process of pelletization by melt extrusion, optional additives can be mixed or other perfluoropolymers can be blended within a range that is not damaging to the physical properties of perfluoropolymers. Additive mixing can also be carried out in conjunction with the mixing process of the said perfluoropolymer dispersion and aqueous dispersion of layered-silicates as well as the melt extrusion process. As examples of additives, glass fibers, carbon fibers, aramid fibers, graphite, carbon black, fullerene, carbon nanotube, carbon nanofibers, silicon oxide, titanium oxide, and silver nanoparticles, can be mentioned. Furthermore, the powder comprising perfluoropolymer primary particles and layered-silicates can be pelletized and used for powder molding or as powder coating materials and rotational molding materials.

There is no specific restriction on the melt-molding method and condition for obtaining molded articles of the present invention. The extrusion condition applied to melt processable fluoropolymers for production of tubes, sheets, films, rods, fibers, wire insulation and jacketing. Containers can be blow molded, films can be blow molded, containers, tray, racks, etc. can be injection molded. Powder molded articles, powder-coated articles and rotationally molded and rotolined articles can be obtained.

Among the molded articles made from the composite of this invention, where the improvement of effect of homogeneously dispersing particles at the nano level in perfluoropolymers can be expected, are for example, tubes, sheets, films, rods, bottles, fibers, packing, linings, sealing, and printed circuit boards. A preferred application is wire insulation, where resistance to dripping on exposure to high temperature, as in fire, is desired. When particles are homogeneously dispersed at the nano level in perfluoropolymers, the viscosity at low shear rate becomes much higher than in the case of perfluoropolymer without nanodispersed particles. Also preferably, perfluoropolymer composite can be used for trays or large-size injection molded articles or extrusion molded articles requiring high dynamic physical properties since the dynamic physical properties such as storage elasticity is superior at temperatures above than the glass transition temperature of fluoropolymers up to 150° C.

EXAMPLES

The present invention is exemplified by Application Examples but is not limited to these examples:

In the present invention, physical properties were measured by the following methods.

A. Measurement of Physical Properties (1) Melting Point (Melting Peak Temperature)

A differential scanning calorimeter (Pyris 1 type DSC, Perkin Elmer Co.) is used. A sample of about 10 mg is weighed, put into an aluminum pan, crimped closed, placed in the DSC (differential scanning calorimeter) and heated from 150° C. to 360° C. at 10° C./minute. Then, the melting peak temperature (Tm) is obtained from the resulting melting curve (melting endotherm).

(2) Glass Transition Temperature

A kinematic rheometer (ARES), Rheometric Scientific Co., is used. A perfluoropolymer composite sample (length 45 mm, width 12.5 mm, thickness 1.3 mm) is compression molded, and the temperature dependence of tan δ in the range of from −50° C. to 150° C. is measured at a frequency of 1 Hz and heating rate 5° C./minute in torsion mode in the kinematic rheometer (ARES). The glass transition temperature is determined from the peak temperature of tan δ curve. Here, in melt processable fluoropolymers, the glass transition temperature (α transition temperature) is a temperature at which a partial motion (Macro-Brownian motion) of molecular chains in the non-crystalline region of fluoropolymers begins (Polymer 2001 (Vol. 42), P5453).

(3) Melt Flow Rate (MFR)

A melt indexer (Toyo Seiki K.K.) provided with a corrosion-resistant cylinder, a die, and a piston in accordance with ASTM D1238-95 is used. The polymer to be tested (5 g) is put in the cylinder, which is maintained at 373±1° C., held for 5 minutes, and extruded through a die orifice under a load of 5 kg (piston plus weight). The extrusion rate (g/10 minute) is the melt flow rate (MFR). The melt flow rate measurement is not carried out on PTFE since its molecular weight is so high, that it cannot be fabricated by the melt processing techniques typically used with thermoplastics such as FEP and PFA.

(4) Dispersion State of Inorganic Layer Compounds

Test pieces of 10 mm×10 mm are cut out in 3 locations from a sample with a thickness of about 200 μm, which is prepared by melt compression molding a perfluoropolymer composite sample at 350° C., and the dispersion state is evaluated by observing agglomerates formed from layered-silicates having a magnitude of 10 μm or larger using an optical (polarization) microscope (OPTIPHOT2-POL, Nikon Co.). A 15 mm×8 mm test piece is cut from the sample where agglomerates are observed comprising layered-silicate of 10 μm or higher. The test piece is embedded in epoxy perfluoropolymer, which is then cured, cut to a 70 nm-thick film by ultra-microtome, and the dispersion state (particle diameter and thickness) of layered-silicate in the perfluoropolymer is observed using a transmission electron microscope (Phillips, CM-300) and evaluated by the following standards. ⊙: Most of layered-silicate is nano-dispersed at a thickness of 50 nm or less. O: Only few agglomerates of layered-silicate remains. X: Many agglomerates of layered-silicate of 10 μm or larger are seen by an optical microscope.

(5) Tensile Physical Properties (Tensile Strength, Elongation, Tensile Elasticity)

Tensile physical properties of a sample having about 1 mm thickness, prepared from perfluoropolymer composites by melt compression molding at 350° C., are measured at tensile velocity of 50 mm/minute in accordance with JIS K 7172.

(56) Melt Viscosity Ratio (Zero Shear Rate Viscosity Ratio)

A 25 mm-diameter test piece is prepared from an about 1.5 mm-thick sheet-form sample, which is obtained from perfluoropolymer composites by melt compression molding at 350° C., and its melt viscosity is measured at 340° C. in a frequency (shear rate) range of 100-0.1 rad/sec using 25 mm parallel plate of ARES rheometer from Rheometric Scientific Co. The ratio ($V_{0.1}/V_1$) of the viscosity ($V_{0.1}$) measured at 340° C. and 0.1 rad/sec to the viscosity ($V_1$) measured at 1 rad/sec is calculated. $V_{0.1}$ is taken as an approximation of the zero shear rate viscosity.

(7) Storage Elasticity (G')

A 12 mm×45 mm×1.5 mm test piece is prepared from an approximately 1.5 mm-thick sheet, which is prepared by melt-compression molding of a perfluoropolymer composite sample at 350° C., and the storage elasticity at −40° C. to 200° C. is measured under condition of torsion mode, at a frequency of 1 Hz and heating rate 5° C./minute using an ARES rheometer of Rheometric Scientific Co.

(8) Analysis of X-Ray Diffraction Results

A 20 mm×20 mm test piece is cut out from an about 1.5 mm-thick sheet-form sample, which is obtained from perfluoropolymer composites by melt compression molding at 350° C., and an X-ray analysis is carried out by the reflection method using an X-ray wide angle scattering measurement device (RIGAKU, Cu Kα radiation, wavelength: 0.154 nm) to evaluate the dispersion structure of layered-silicates such as interplanar spacing and thickness in the perfluoropolymer matrix (Elements of X-Ray Diffraction, Addison-Wesley, Reading, Mass., 1978, P99-P109).

Further, to examine the dispersion structure of layered-silicates in aqueous dispersions of layered-silicates before mixing with PFA dispersions, the aqueous dispersions of the layered-silicates are coated on a glass and dried, and the X-ray diffraction measurement is carried out to determine the interplanar spacing and thickness of the layered-silicates in the aqueous dispersions.

It is preferred that the layer thickness of the layered-silicates in the perfluoropolymer composite of the invention be less than about 100 nm, preferably less than about 50 nm, more preferably less than about 30 nm, most preferably less than about 15 nm.

B. Raw Materials:

The following raw materials are used in the Application Examples of the present invention and comparative examples.

(1) Perfluoropolymer Emulsion

PFA aqueous dispersion obtained by emulsion polymerization (PFA solids content: 29% by weight, average particle diameter of PFA primary particles: 200 nm, pH: 9, polymer melting point: 309° C., melt flow rate: 2 g/10 minute), Du Pont-Mitsui Chemicals Co.

(2) Inorganic Layered Compounds (a) ME-100 (swelling synthetic mica, particle diameter: 2-5 μm, Coop Chemicals Co.)

(b) SWN (swelling synthetic smectite, particle diameter: about 0.05 μm, Coop Chemicals Co.)

(c) Kunipia (Na-montmorillonite, particle diameter: about 2 μm, Kunimine Industries Co.)

Application Example 1

Figure 2:
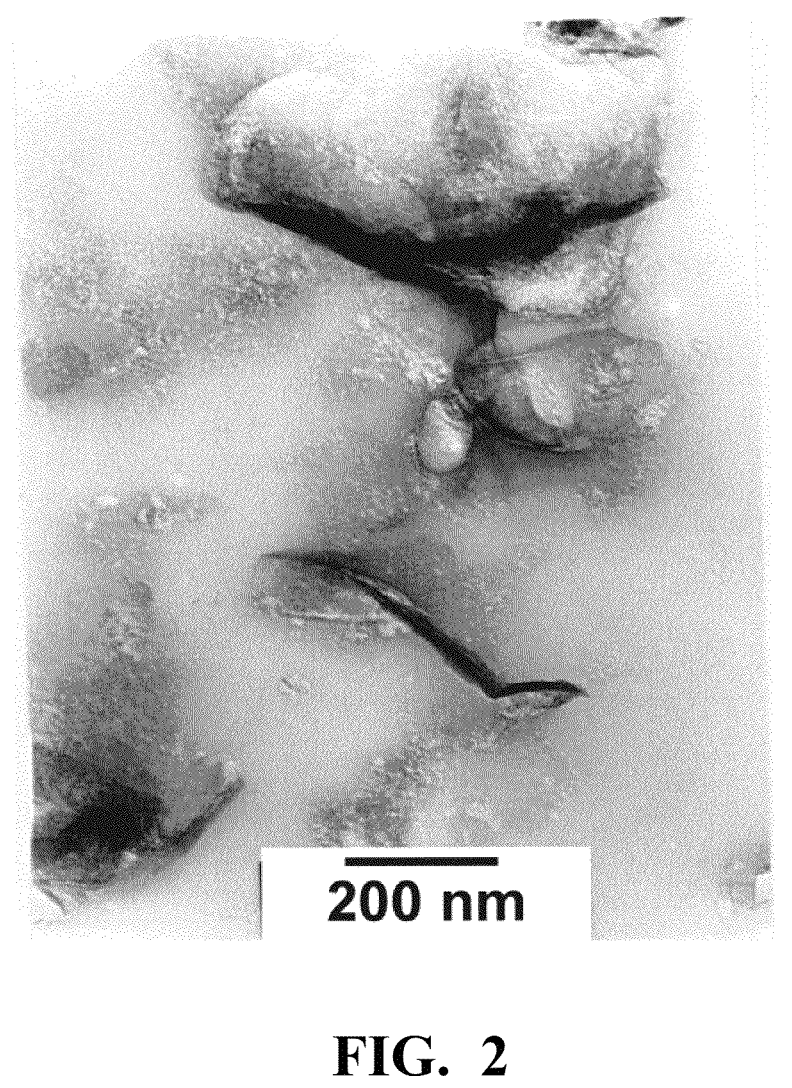

Swelling synthetic mica (ME-100) 10.53 g and deionized water 500 g are put into a beaker (2 L), stirred at 350 rpm for 6 hours using downflow-type propeller stirring apparatus equipped with four angled horizontal vanes, and then ultrasound treated for 15 minutes to obtain an aqueous dispersion of ME-100. PFA aqueous dispersion 687.3 g is added to make the content of ME-100 in the PFA perfluoropolymer composite 5% by weight. The mixed dispersions are stirred at 350 rpm for 30 minutes. Then, 6 g of 60% nitric acid is added and stirred continuously until agglomeration of the PFA and ME-100 appears to be complete. The resulting gelatinous agglomerate is further stirred at 450 rpm for 5 min to remove excess water from the agglomerate, which is then dried at 170° C. for 10 hours to obtain the agglomerate as dry powder. The dry powder of (hereinafter, called sample before melt-mixing) is compression-molded at 350° C., and on the resulting samples, which are about 1.0 mm and 1.5 mm thick, and 200 μm thick, the tensile physical properties and MFR measurement, optical transmission electron microscope observation and viscosity measurement are carried out as described above. The results are summarized in Tables 1 and 2. The dry powder of the agglomerate is further melt mixed at 350° C. and 100 rpm for 3 min using melt mixer (R-60 batch mixer, Toyo Seiki Seisakusho K.K.) to obtain a perfluoropolymer composite (hereinafter called melt mixed sample). After melt-mixing, the sample is compression molded at 350° C., resulting in a sample about 1.0 mm thick, the physical properties are measured. The results are summarized in Tables 3 to 6. X-ray measurement results are summarized in Table 7. According to the X-ray analytical results, the thickness (H001) of the layered compound in the fluoropolymer matrix is 11.3 nm. It was also confirmed by transmission electron microscopy that ME-100 of thickness of about 10 nm is dispersed in the fluoropolymer matrix (FIG. 2). For comparison, the thickness of ME-100 in the aqueous dispersion is 15.8 nm.

Application Example 2

Swelling synthetic mica (ME-100) 15.05 g and deionized water 500 g are put into a beaker, stirred at 350 rpm for 6 hours using a downflow-type propeller stirring apparatus equipped with 4 sheets of vanes, and then ultrasound treated for 15 minutes to obtain a dispersion of ME-100. A PFA aqueous dispersion 687.3 g is added to make the content of ME-100 in the PFA perfluoropolymer composite 7% by weight, and dry powder of agglomerate and a melt-mixed perfluoropolymer composite are obtained by the same procedure as in Application Example 1. The dry powder of agglomerate and the melt-mixed perfluoropolymer composite are compression molded at 350° C. The physical properties on the resulting samples are summarized in Tables 1 to 6. X-ray measurement results are summarized in Table 7. According to the X-ray analytical results, the thickness (H001) of the layered compound in the perfluoropolymer matrix is 10.6 nm.

Application Example 3

Swelling synthetic mica (ME-100) 22.2 g and deionized water 500 g are put into a beaker, stirred at 350 rpm for 6 hours using a downflow-type propeller stirring apparatus equipped with 4 sheets of vanes, and ultrasound treated for 15 minutes to obtain a dispersion of ME-100. A PFA aqueous dispersion 687.3 g is added to make the content of ME-100 in the PFA perfluoropolymer composite 10% by weight, and dry powder of agglomerate and a melt-mixed perfluoropolymer composite are obtained by the same procedure as in Application Example 1. The dry powder of agglomerate and the melt-mixed perfluoropolymer composite are compression molded at 350° C. The physical properties on the resulting samples are summarized in Tables 1 to 6. X-ray measurement results are summarized in Table 7. According to the X-ray analytical results, the thickness (H001) of the layered compound in the fluoropolymer matrix is 10.2 nm.

Application Example 4

Swelling synthetic mica (ME-100) 10.53 g and deionized water 500 g are put into a beaker, stirred at 350 rpm for 2 hours using a downflow-type propeller stirring apparatus equipped with 4 sheets of vanes, and ultrasound-treated for 15 minutes to obtain a dispersion of ME-100. A PFA aqueous dispersion 687.3 g is added to make the content of ME-100 in the PFA perfluoropolymer composite 5% by weight, and dry powder of agglomerate and a melt-mixed fluoropolymer composite are obtained by the same procedure as in Application Example 1. The dry powder of agglomerate and the melt-mixed perfluoropolymer composite are compression molded at 350° C. The physical properties on the resulting samples are summarized in Tables 1 to 6. X-ray measurement results are summarized in Table 7. According to the X-ray analytical results, the thickness (H001) of the layered compound in the fluoropolymer matrix is 25 nm. Further, it was confirmed by transmission electron microscope that ME-100 having thickness of about 20 nm is dispersed in the fluoropolymer matrix.

Application Example 5

Figure 3:
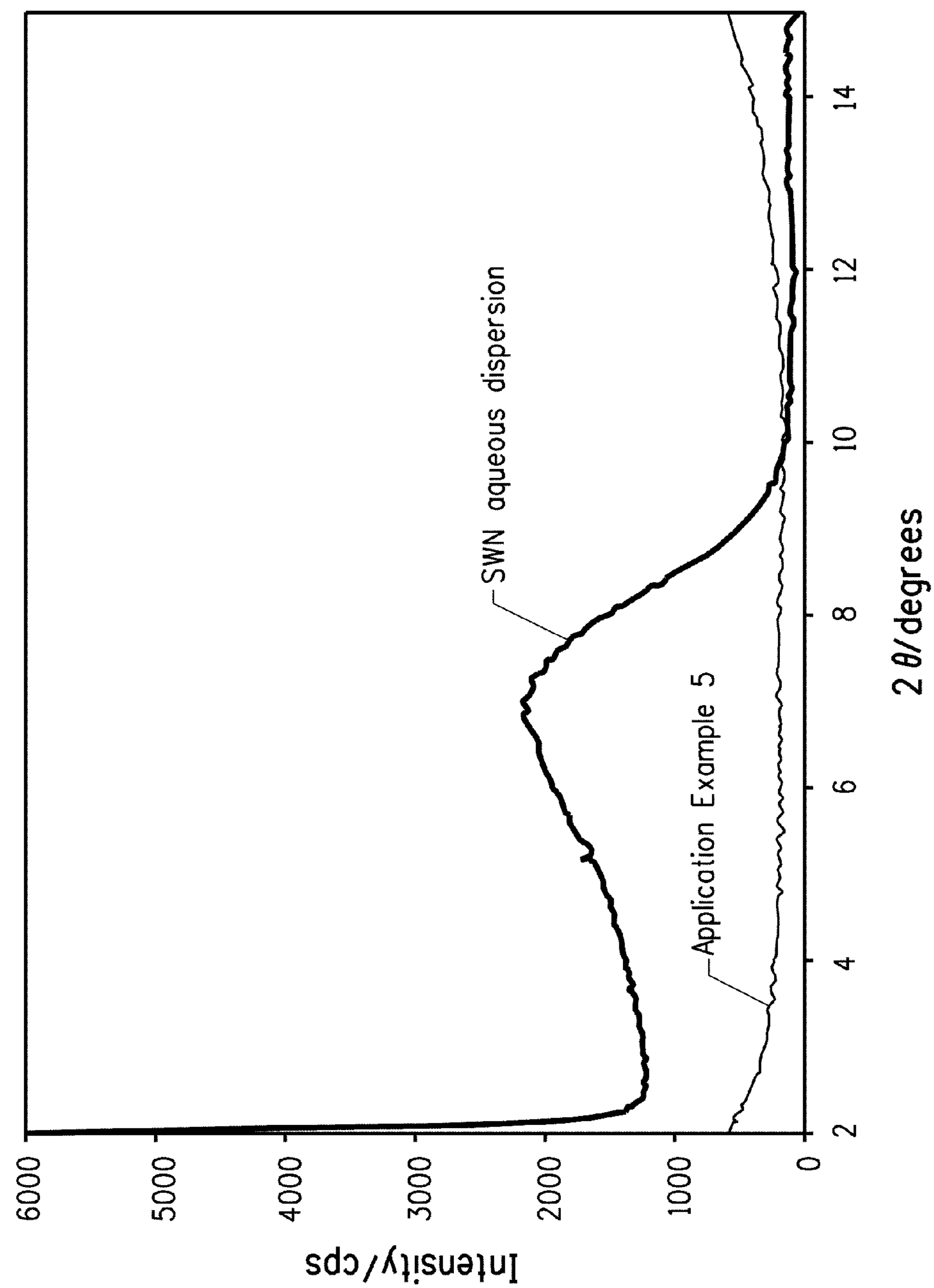
FIG. 3 is X-ray diffraction patterns of perfluoropolymer composite used in Application Example 5 and aqueous dispersion of a swelling synthetic smectite (SWN) itself.
Figure 4:
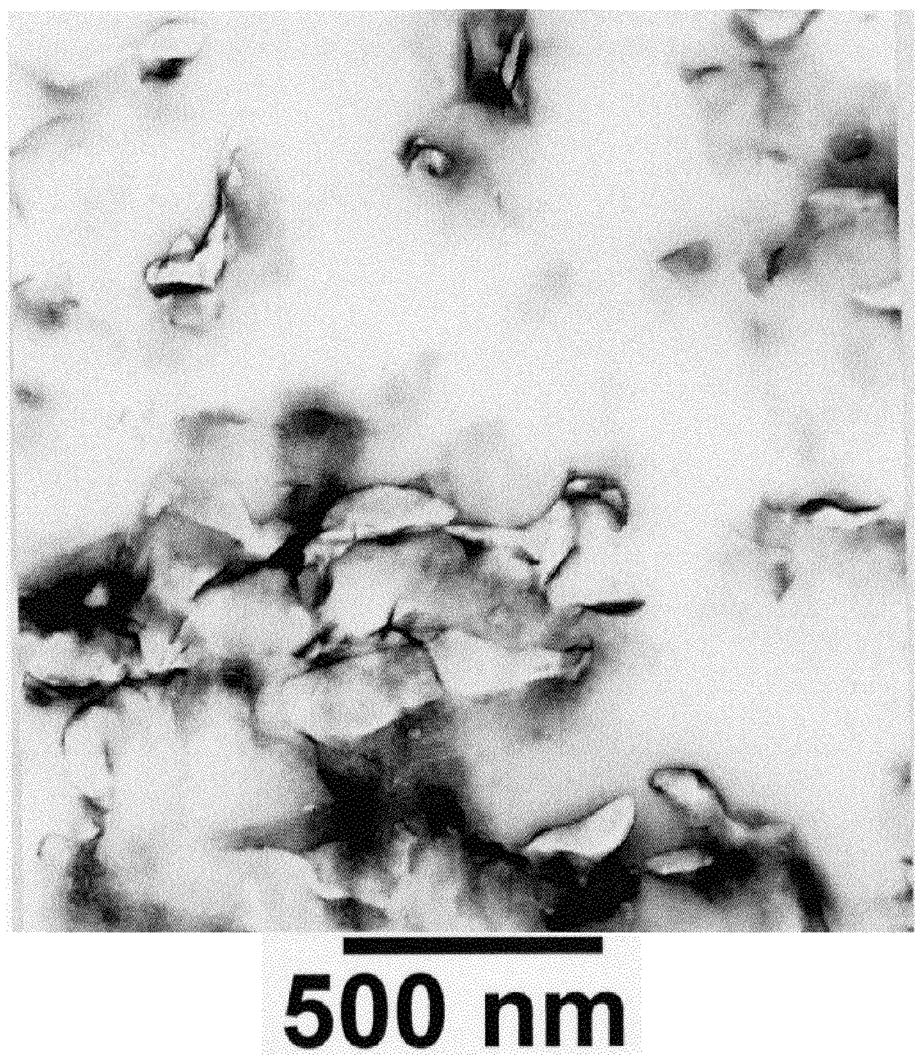
FIG. 4 is a transmission electron microphotography of perfluoropolymer composite used in Application Example 5.

Synthetic smectite (SWN) 10.53 g and deionized water 500 g are put into a beaker, stirred at 350 rpm for 6 hours using a downflow-type propeller stirring apparatus equipped with 4 sheets of vanes, and ultrasound-treated for 15 minutes to obtain a dispersion of SWN. A PFA aqueous dispersion 687.3 g is added to make the content of SWN in the PFA perfluoropolymer composite 5% by weight and dry powder of agglomerate and a melt-mixed perfluoropolymer composite are obtained by the same procedure as in Application Example 1. The dry powder of agglomerate and the melt-mixed perfluoropolymer composite are compression-molded at 350° C. The physical properties on the resulting samples are summarized in Tables 1 to 6. X-ray measurement results are summarized in Table 7. SWN is completely separated and nano-dispersed in the PFA matrix because the diffraction peak of SWN disappeared in the X-ray diffraction pattern of the sample where SWN is dispersed in the PFA matrix (FIG. 3). According to the calculation from X-ray analytical results, the thickness (H001) of SWN dispersed in the fluoropolymer matrix is 1 nm. Further, it was confirmed by transmission electron microscopy that SWN having thickness of about 1 nm is dispersed in the fluoropolymer matrix (FIG. 4). As reference, the thickness of SWN in the aqueous dispersion is 2.5 nm.

Application Example 6

Figure 5:
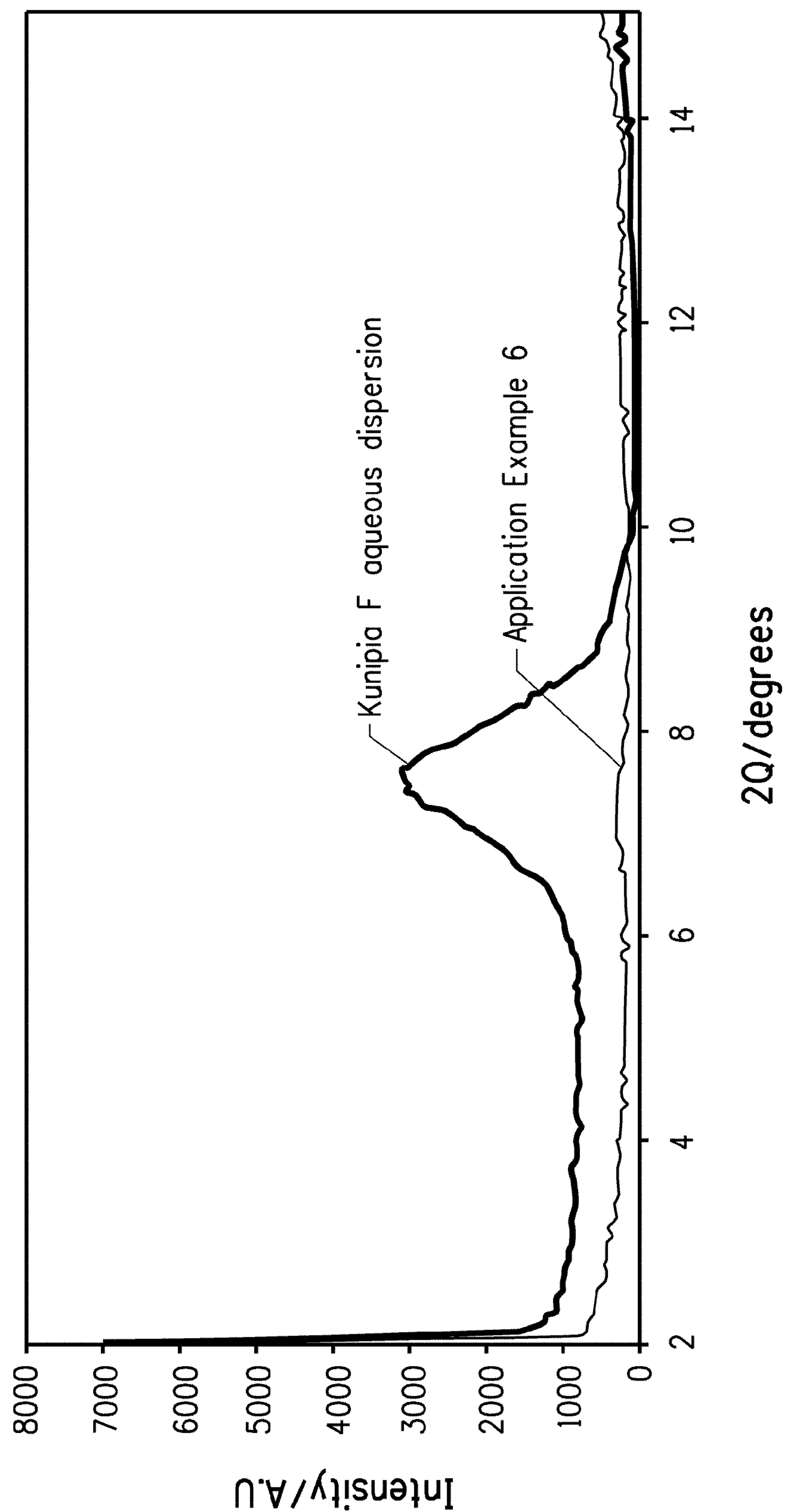
FIG. 5 is X-ray diffraction patterns of perfluoropolymer composite used in Application Example 6 and aqueous dispersion of Kunipia F.

Na-montmorillonite (Kunipia F) 10.53 g and deionized water 500 g are put into a beaker, stirred at 350 rpm for 6 hours using a downflow-type propeller stirring apparatus equipped with 4 sheets of vanes, and ultrasound-treated for 15 minutes to obtain a dispersion of Kunipia F. A PFA aqueous dispersion 687.3 g is added to make the content of Kunipia F in the PFA perfluoropolymer composite 5% by weight and dry powder of agglomerate and a melt-mixed perfluoropolymer composite are obtained by the same procedure as in Application Example 1. The dry powder of agglomerate and the melt-mixed perfluorocarbon carbon perfluoropolymer composite are compression-molded at 350° C. The physical properties on the resulting samples are summarized in Tables 1 to 6. X-ray measurement results are summarized in Table 7. Kunipia F is completely separated and nano-dispersed in the PFA matrix because the diffraction peak of Kunipia F disappeared in an X-ray diffraction pattern of the sample where Kunipia F is dispersed in the PFA matrix (FIG. 5). According to calculations from X-ray analytical results, the thickness (H001) of the Kunipia F dispersed in the fluoropolymer matrix is 1 nm. As reference, the thickness of Kunipia F in the aqueous dispersion is 6 nm.

Comparative Example 1

Swelling synthetic mica (ME-100) 7 g and PFA powder 63 g, which is obtained from the PFA aqueous dispersion of Application Example 1 by agglomerating and drying, are melt-mixed at 350° C. and 100 rpm for 3 min using a melt mixer (R-60 batch mixer, Toyo Seiki Seisakusho K.K.) to obtain a perfluoropolymer composite. The perfluoropolymer composite is compression-molded at 350° C. The physical properties on the resulting samples are summarized in Tables 2 and 4. Because there can be no "before melt mixing" results for this Example, The Comparative Example 1 results in the "before melt-mixing tables" (Tables 1 and 3) the results of melt-mixed samples are reported in these tables in parentheses. Further, because it is seen from the polarization microscope observation results that a great number of ME-100 have a size of about 150 μm, ME-100 is not nano-dispersed, the X-ray and transmission electron microscope observations are omitted.

Reference Example

The physical properties of fluoropolymers themselves, that is, wherein the use of layered-silicate is omitted, are summarized in Tables 2 and 4. Since only the results of melt-mixed samples were measured, these are substituted for the results before melt-mixing in Tables 1 and 3, in parentheses to note the difference.

TABLE 1

| | Physical properties of the composites Before melt mixing | | | | | | |
|---|---|---|---|---|---|---|---|
| | PFA Wt % | Layered compound Weight (%) | MFR (g/10 min) | Tensile strength (MPa) | Elongation (%) | Tensile elasticity (MPa) | Layered compound dispersion state |
| Application Example 1 | 95 | 5 | 0.2 or less | 16.1 | 3.9 | 833 | ⊙ |
| Application Example 2 | 93 | 7 | 0.2 or less | 13.2 | 1.8 | 1165 | ⊙ |
| Application Example 3 | 90 | 10 | 0.2 or less | 13.4 | 1.3 | 1410 | ⊙ |
| Application Example 4 | 95 | 5 | 0.2 or less | 16.5 | 113 | 732 | ○ |
| Application Example 5 | 95 | 5 | 0.2 or less | 19.4 | 19.1 | 859 | ⊙ |
| Application Example 6 | 95 | 5 | 0.2 or less | 18.6 | 3.6 | 826 | ⊙ |

TABLE 1-continued

| | PFA Wt % | Layered compound Weight (%) | Physical properties of the composites Before melt mixing MFR (g/10 min) | Tensile strength (MPa) | Elongation (%) | Tensile elasticity (MPa) | Layered compound dispersion state |
|---|---|---|---|---|---|---|---|
| Comparative Example 1 | 90 | 10 | (0.95) | (22.5) | (328) | (659) | X |
| Reference Example 1 | 100 | 0 | (2.0) | (32.1) | (353) | (420) | — |

TABLE 2

| | PFA Wt % | Layered compound Weight (%) | Physical properties of the composites After melt mixing MFR (g/10 min) | Tensile strength (MPa) | Elongation (%) | Tensile elasticity (MPa) | Layered compound dispersion state |
|---|---|---|---|---|---|---|---|
| Application Example 1 | 95 | 5 | 1.31 | 20.5 | 215 | 710 | ⊙ |
| Application Example 2 | 93 | 7 | 0.83 | 16.9 | 54.3 | 831 | ⊙ |
| Application Example 3 | 90 | 10 | 0.35 | 16.9 | 5.1 | 1037 | ⊙ |
| Application Example 4 | 95 | 5 | 1.86 | 25.4 | 268 | 627 | ○ |
| Application Example 5 | 95 | 5 | 0.55 | 22.5 | 257 | 689 | ⊙ |
| Application Example 6 | 95 | 5 | 0.52 | 20.1 | 196 | 746 | ⊙ |
| Comparative Example 1 | 90 | 10 | 0.95 | 22.5 | 328 | 659 | X |
| Reference Example 1 | 100 | 0 | 2.0 | 32.1 | 353 | 420 | — |

TABLE 3

| | PFA Wt % | Layered compound Weight (%) | Storage elasticity of composites Before melt mixing G' (Pa) 25° C. | G' (Pa) 100° C. | G' (Pa) 150° C. | G' (Pa) 200° C. | $G'_S/G'_F$ 200° C. |
|---|---|---|---|---|---|---|---|
| Application Example 1 | 95 | 5 | 5.6E±08 | 2.4E±08 | 1.6E±08 | 1.2E±08 | 4.3 |
| Application Example 2 | 93 | 7 | 6.9E±08 | 3.4E±08 | 2.4E±08 | 1.8E±08 | 6.4 |
| Application Example 3 | 90 | 10 | 8.8E±08 | 4.6E±08 | 3.3E±08 | 2.6E±08 | 9.3 |
| Application Example 4 | 95 | 5 | 4.0E±08 | 1.5E±08 | 8.8E±07 | 6.1E±07 | 2.2 |
| Application Example 5 | 95 | 5 | 5.1E±08 | 2.3E±08 | 1.6E±08 | 1.2E±08 | 4.3 |
| Application Example 6 | 95 | 5 | 5.7E±08 | 2.7E±08 | 1.9E±08 | 1.5E±08 | 5.4 |
| Comparative Example 1 | 90 | 10 | (4.6E±08) | (1.6E±08) | (7.9E±07) | (5.2E±07) | (1.9) |
| Reference Example 1 | 100 | 0 | 2.4E±08 | 7.0E±07 | 4.0E±07 | 2.8E±07 | 1.0 |

TABLE 4

| | PFA Wt % | Layered compound Weight (%) | Storage elasticity of the compositions After melt mixing G' (Pa) 25° C. | G' (Pa) 100° C. | G' (Pa) 150° C. | G' (Pa) 200° C. | $G'_S/G_F$ 200° C. |
|---|---|---|---|---|---|---|---|
| Application Example 1 | 95 | 5 | 5.0E±08 | 1.9E±08 | 1.2E±08 | 8.0E±07 | 2.9 |
| Application Example 2 | 93 | 7 | 5.7E±08 | 2.3E±08 | 1.4E±08 | 1.0E±08 | 3.6 |
| Application Example 3 | 90 | 10 | 6.8E±08 | 2.9E±08 | 1.8E±08 | 1.3E±08 | 4.6 |
| Application Example 4 | 95 | 5 | 3.8E±08 | 1.3E±08 | 8.2E±07 | 5.8E±07 | 2.1 |
| Application Example 5 | 95 | 5 | 3.9E±08 | 1.5E±08 | 9.3E±07 | 6.5E±07 | 2.3 |
| Application Example 6 | 95 | 5 | 4.4E±08 | 1.7E±08 | 1.0E±08 | 7.0E±07 | 2.5 |
| Comparative Example 1 | 90 | 10 | 4.6E±08 | 1.6E±08 | 7.9E±07 | 5.2E±07 | 1.9 |
| Reference Example 1 | 100 | 0 | 2.4E±08 | 7.0E±07 | 4.0E±07 | 2.8E±07 | 1.0 |

TABLE 5

| | PFA Wt % | Layered compound Weight (%) | Viscosity of compositions Before melt-mixing $V_{0.1}$ (Pa · s) | $V_1$ (Pa · s) | $V_{10}$ (Pa · s) | $V_{100}$ (Pa · s) | $V_{0.1}/V_1$ |
|---|---|---|---|---|---|---|---|
| Application Example 1 | 95 | 5 | 464330 | 115340 | 7450 | 514 | 4.03 |
| Application Example 2 | 93 | 7 | 824180 | 163130 | 10616 | 569 | 5.05 |
| Application Example 3 | 90 | 10 | 1436200 | 236970 | 11327 | 538 | 6.06 |
| Application Example 4 | 95 | 5 | 35967 | 20368 | 10289 | 4027 | 1.77 |
| Application Example 5 | 95 | 5 | 490800 | 86487 | 7293 | 377 | 5.67 |
| Application Example 6 | 95 | 5 | 788510 | 156880 | 10122 | 557 | 5.03 |
| Comparative Example 1 | 90 | 10 | (9629) | (8987) | (7247) | (3619) | (1.07) |
| Reference Example 1 | 100 | 0 | 8611 | 8122 | 6486 | 3017 | 1.06 |

TABLE 6

| | PFA Wt % | Layered compound Weight (%) | Viscosity of composites After melt-mixing $V_{0.1}$ (Pa · s) | $V_1$ (Pa · s) | $V_{10}$ (Pa · s) | $V_{100}$ (Pa · s) | $V_{0.1}/V_1$ |
|---|---|---|---|---|---|---|---|
| Application Example 1 | 95 | 5 | 79092 | 31252 | 14597 | 5437 | 2.53 |
| Application Example 2 | 93 | 7 | 117790 | 33949 | 10868 | 3051 | 3.47 |
| Application Example 3 | 90 | 10 | 226150 | 52444 | 14831 | 4692 | 4.31 |
| Application Example 4 | 95 | 5 | 20893 | 13935 | 8084 | 3309 | 1.50 |
| Application Example 5 | 95 | 5 | 235990 | 52453 | 16604 | 4789 | 4.50 |
| Application Example 6 | 95 | 5 | 183340 | 64045 | 22158 | 6676 | 2.86 |
| Comparative Example 1 | 90 | 10 | 9629 | 8987 | 7247 | 3619 | 1.07 |
| Reference Example | 100 | 0 | 8611 | 8122 | 6486 | 3017 | 1.06 |

TABLE 7

| | PFA Weight (%) | Layered compound Weight (%) | X-ray diffraction results of the compositions | |
|---|---|---|---|---|
| | | | Interplanar spacing ($d_{001}$) (nm) | Layer thickness ($H_{001}$) (nm) |
| Application Example 1 | 95 | 5 | 1.0 | 11.3 |
| Application Example 2 | 93 | 7 | 1.0 | 10.6 |
| Application Example 3 | 90 | 10 | 1.0 | 10.2 |
| Application Example 4 | 95 | 5 | 1.0 | 25.0 |
| Application Example 5 | 95 | 5 | — | (1.0) |
| Application Example 6 | 95 | 5 | — | (1.0) |

It is observed from the X-ray diffraction and transmission electron microscope observation results that layered-silicates with thickness of 25 nm or less were homogeneously dispersed at the nano level in the PFA matrix in all of the Application Examples (1 to 6). In Comparative Example 1, where the layered-silicate and PFA were directly melt-mixed, however, a great number of layered-silicates having a size of 100 μm are observed even by an optical microscope.

In the samples before melt-mixing shown in Table 1, the perfluoropolymer compositions (Application Examples 1 to 6) by the present invention have higher tensile elasticity than PFA itself, and this elasticity increases with the increasing content of the layered-silicate. However, elongation is extremely low. Furthermore, MFR in the samples in Application Examples 1 to 6 of the present invention is expressed as 0.2 g/10 minutes or less since molten strand came out only slightly from the die and the measurement could not be made.

In the storage elasticity (G') of samples before melt mixing in Table 3, the storage elasticity ratio ($G'_S/G'_F$) at 200° C. of samples obtained by nanodispersing layered-silicates in PFA matrix (Application Examples 1 to 6, except Application Example 4) is 4 or greater of the storage elasticity of PFA itself (Reference Example 1), and the storage elasticity rises to a high level. Particularly, in Application Example 3 where the sample contains 10% of swelling synthetic mica (ME-100), the storage elasticity at 200° C. is 9 times the storage elasticity of the PFA itself. Even in the sample (Application Example 4) where the mixing time is reduced to 2 hours and the ME-100 content is 5%, the storage elasticity at 200° C. is at least twice the storage elasticity of the PFA itself. This is due to the fact that layered-silicates are homogeneously dispersed at the nano level in the PFA matrix. On the other hand, in the sample without nano dispersion (Comparative Example 1), the storage elasticity at 200° C. is at most twice the storage elasticity of the PFA itself (Reference Example 1) even when the ME-100 content is 10%.

In the viscosity ratio of samples before melt-mixing in Table 5, the viscosity ratio ($V_{0.1}/V_1$) of samples obtained by nanodispersing layered-silicates in PFA matrix (Application Examples 1, 2, 3, 5, and 6) is 4 or greater, and high zero shear rate viscosity is found (except in Application Example 4). In the sample in which there is no nanodispersal (Comparative Example 1) and in PFA itself (Reference Example 1) however, the viscosity ratio ($V_{0.1}/V_1$) is 1.3 or less and almost no thixotropy is observed.

In samples after melt-mixing of Table 2, the elongation of samples obtained by melt-mixing 5% of layered-silicates (Application Examples 1, 4, 5, and 6) rise to above 200%. The storage elasticity at 200° C. of samples obtained by nanodispersing layered-silicates in PFA matrix through melt mixing is summarized in Table 4. In Application Examples 1 to 6 the storage elasticity is twice or greater than the storage elasticity of PFA itself (Reference Example 1), Particularly, in Application Example 3 where the sample contained 10% of swelling synthetic mica (ME-100), the storage elasticity at 200° C. is 4.6 times of the storage elasticity of the PFA itself. Even in the sample (Application Example 4) where the mixing time of the mixing solution is reduced to 2 hours and the ME-100 content is 5%, the storage elasticity at 200° C. is at least twice the storage elasticity of the PFA itself. This is due to the fact that layered-silicates are homogeneously dispersed at the nano level in the PFA matrix. Accordingly, there appears such a tendency that the change of the storage elasticity after melt mixing becomes large as the storage elasticity before melt mixing increases. In the sample of no nano dispersion (Comparative Example 1), however, the storage elasticity at 200° C. is at most twice of the storage elasticity of the PFA itself (Reference Example 1) even when the content of ME-100 is 10%.

The viscosity ratio ($V_{0.1}/V_1$) of samples obtained by nanodispersing layered-silicates in PFA matrix by melt-mixing (Application Examples 1 to 6) declines to 55-85% of the samples before melt-mixing, but shows high zero shear rate viscosity as compared to PFA itself. Particularly, in the case of Application Example 5 containing 5% by weight of SWN, the viscosity ratio ($V_{0.1}/V_1$) becomes 4.5 even in melt-mixing and shows extremely high zero shear rate viscosity. This is due to that layer separated SWN having a dimension of about 50 nm and thickness of several nm is homogeneously dispersed in PFA matrix at the nano level.

The present invention provides perfluoropolymer composites superior in dynamic physical properties and having high zero shear rate viscosity and having notably improved storage elasticity at temperatures greater than the glass transition temperature of fluoropolymers or at 150° C. or higher, wherein the perfluoropolymers are obtained by stirring perfluoropolymer dispersions (hereinafter, sometimes called latexes), which are stably dispersing fluoropolymer primary particles surrounded with surfactants (hereinafter, sometimes called emulsifying agents) in water, and aqueous dispersions of layered-silicates having swelling or cleaving property, to obtain aqueous dispersions containing homogeneously mixed perfluoropolymer primary particles and swelling or cleaving layered-silicates, agglomerating the blended polymer and layered-silicate dispersions by freezing the aqueous dispersions at a temperature of 0° C. or lower, or adding electrolytes to change the ionic strength or the pH of the mixed solution, or applying shear, and separating the agglomerates from the aqueous solutions, and drying to disperse homogeneously the layered-silicates in the perfluoropolymers at the nano level.

The molded articles produced from perfluoropolymer composites of the present invention can be applied to all fields, where the benefits of homogeneously dispersing particles at the nano level in perfluoropolymers can be expected. For example, the perfluoropolymer composites can be used for tubes, sheets, films, rods, fibers, packings, linings, sealings, electric wires, among other things, made by processes which include compression-molding, transfer-molding, blow-molding, injection-molding, and lining.

The perfluoropolymer composites provided by the present invention are most suitable for perfluoropolymer articles such as insulation for conductors, which will resist dripping when exposed to flame, since when particles are homogeneously dispersed at the nano level in perfluoropolymers, the viscosity at extremely low shear (e.g. gravity) becomes extremely high as compared to the case in which the polymer contains no nanodispersed particles.

In molded articles from perfluoropolymer composites provided by the present invention, the dynamic physical properties such as the storage elasticity at temperatures greater than the glass transition temperature of fluoropolymers or temperatures greater than 150° C. are improved when particles are homogeneously dispersed at the nano level in the perfluoropolymer, and thus the perfluoropolymer composites of the present invention are most suitable for uses requiring high dynamic strength even at high temperature such as trays, large-size injection molded articles or extrusion molded articles.

The invention claimed is:

1. Perfluoropolymer composite obtained by dispersing layered-silicate having properties of swelling or cleaving in water to form an aqueous dispersion of said layered-silicate, adding said aqueous dispersion to an aqueous dispersion of perfluoropolymer having a melt flow rate of 0.5 to 100 g/10 min and agglomerating the resultant mixture of dispersions by changing the ionic strength or pH of said resultant mixture by adding 0.001 to 5 weight percent of electrolyte thereto based on the combined weight of said aqueous dispersion of layered-silicate and said aqueous dispersion of perfluoropolymer, and applying shear to obtain as a result thereof said perfluoropolymer composite comprising a dispersion of particles of said layered-silicate homogeneously dispersed at the nano-level in said perfluoropolymer, wherein the layer thickness of said layered-silicate in said perfluoropolymer composite is less than about 25 nm, and wherein the ratio of the storage elasticity ($G'_s$) of the perfluoropolymer composite to the storage elasticity ($G'_F$) of the perfluoropolymer, $G'_s/G'_F$, is 3 or greater at temperatures greater than the glass transition temperature of said perfluoropolymer, said perfluoropolymer being a copolymer of tetrafluoroethylene and perfluoro(alkyl vinyl ether), wherein said alkyl contains from 1 to 5 carbon atoms.

2. The composite of claim 1, wherein said layered-silicate having properties of swelling or cleaving in the said dispersion media is at least one layered-silicate selected from the group consisting of smectite-group clay minerals and swelling mica-group clay minerals.

3. The composite of claim 1, wherein said the content of layered-silicate in said perfluoropolymer composite is 0.5-15% by weight with respect to the perfluoropolymer composite.

4. A method of producing the perfluoropolymer composite of claim 1 by mixing an aqueous dispersion of perfluoropolymer having a melt flow rate of 0.5 to 100 g/10 min with an aqueous dispersion containing layered-silicate having properties of swelling or cleaving in dispersion media under stirring to obtain mixed aqueous dispersion, agglomerating said mixed aqueous dispersion of perfluoropolymer and layered-silicate by changing the ionic strength or the pH by adding electrolyte thereto and applying shear, separating the aqueous components from the agglomerates, and drying to obtain as a result thereof the dispersion of said layered-silicate in said perfluoropolymer, wherein the ratio of the storage elasticity ($G'_s$) of the perfluoropolymer composite to the storage elasticity ($G'_F$) of the perfluoropolymer, $G'_s/G_F'$, is 3 or greater at temperatures greater than the glass transition temperature of said perfluoropolymer, said perfluoropolymer being a copolymer of tetrafluoroethylene and perfluoro(alkyl vinyl ether), wherein said alkyl contains from 1 to 5 carbon atoms.

5. Pellets obtained by melt-extruding the perfluoropolymer composite of claim 1.

6. Insulated conductor or jacket for insulated conductor made by extrusion of perfluoropolymer composite obtained by dispersing layered-silicate having properties of swelling or cleaving in water to form an aqueous dispersion of said layered-silicate, adding said aqueous dispersion to an aqueous dispersion of perfluoropolymer having a melt flow rate of 0.5 to 100 g/10 min and agglomerating the resultant mixture of dispersions by changing the ionic strength or pH of said resultant mixture by adding 0.001 to 5 weight percent of electrolyte thereto based on the combined weight of said aqueous dispersion of layered-silicate and said aqueous dispersion of perfluoropolymer, and applying shear to obtain as a result thereof said perfluoropolymer composite comprising a dispersion of particles of said layered-silicate homogeneously dispersed at the nano-level in said perfluoropolymer, wherein the layer thickness of said layered-silicate in said perfluoropolymer composite is less than about 25 nm, and wherein the ratio of the storage elasticity ($G'_s$) of the perfluoropolymer composite to the storage elasticity ($G'_F$) of the perfluoropolymer, $G'_s/G_F'$, is 3 or greater at temperatures of 60° C. or greater than the glass transition temperature of said perfluoropolymer, said perfluoropolymer being a copolymer of tetrafluoroethylene and perfluoro(alkyl vinyl ether), wherein said alkyl contains from 1 to 5 carbon atoms.

7. The insulated conductor or jacket for insulated conductor of claim 6, wherein said perfluoropolymer composite has the ratio ($V_{0.1}/V_1$) of the viscosity ($V_{0.1}$) measured at 340° C. and 0.1 rad/sec by parallel plate mode of a dynamic rheometer to the viscosity ($V_1$) measured at 340° C. and 1 rad/sec is 1.5 or greater.

8. Tube, sheet, or film made from the perfluoropolymer composite of claim 1.

9. Blow-molded articles made from the perfluoropolymer composite of claim 1.

10. Injection molded articles made from the perfluoropolymer composite of claim 1.

11. Perfluoropolymer composite obtained by dispersing layered-silicate having properties of swelling or cleaving in water to form an aqueous dispersion of said layered-silicate, adding said aqueous dispersion to an aqueous dispersion of perfluoropolymer having a melt flow rate of 0.5 to 100 g/10 min, and agglomerating the resultant mixture of dispersions by adding 0.001 to 5 weight percent of electrolyte thereto based on the combined weight of said aqueous dispersion of layered-silicate and said aqueous dispersion of perfluoropolymer, and applying shear to obtain as a result thereof said perfluoropolymer composite comprising a dispersion of said layered-silicate homogeneously dispersed at the nano-level in said perfluoropolymer wherein the layer thickness of said layered-silicate in said perfluoropolymer composite is less than about 25 nm, and wherein the X-ray diffraction peak for the layered silicate, visible in said aqueous dispersion of said layered silicate, is not visible in said dispersion of layered silicate in said perfluoropolymer, wherein the ratio of the storage elasticity ($G'_s$) of the perfluoropolymer composite to the storage elasticity ($G'_F$) of the perfluoropolymer, $G'_s/G_F'$, is 3 or greater at temperatures greater than the glass transition temperature of said perfluoropolymer, said perfluoropolymer being a copolymer of tetrafluoroethylene and perfluoro(alkyl vinyl ether), wherein said alkyl contains from 1 to 5 carbon atoms.

12. The perfluoropolymer composite of claim 11, wherein said temperature greater than the glass transition temperature of said perfluoropolymer is at least 60° C. higher than said glass transition temperature.

13. The perfluoropolymer composite of claim 1, wherein said temperature greater than the glass transition temperature of said perfluoropolymer is at least 60° C. higher than said glass transition temperature.

14. The method of claim 4, wherein said temperature greater than the glass transition temperature of said perfluoropolymer is at least 60° C. higher than said glass transition temperature.

* * * * *

UNITED STATES PATENT AND TRADEMARK OFFICE

CERTIFICATE OF CORRECTION

PATENT NO. : 8,784,961 B2
APPLICATION NO. : 12/482633
DATED : July 22, 2014
INVENTOR(S) : Pham Hoai Nam et a.

It is certified that error appears in the above-identified patent and that said Letters Patent is hereby corrected as shown below:

In the Specification

Column 10, line 25, in place of "in the cylinder, which is maintained at 373±1°C, held for 5" should appear -- in the cylinder, which is maintained at 372±1°C, held for 5 --

Signed and Sealed this
Thirty-first Day of March, 2015

Michelle K. Lee
*Director of the United States Patent and Trademark Office*